United States Patent
Choi et al.

(10) Patent No.: US 12,489,613 B2
(45) Date of Patent: Dec. 2, 2025

(54) METHOD AND DEVICE FOR QoS ASSURANCE OF QUANTUM KEY DISTRIBUTION NETWORK BASED ON MACHINE LEARNING AND AUTONOMIC LIFE CYCLE MANAGEMENT

(71) Applicant: ELECTRONICS AND TELECOMMUNICATIONS RESEARCH INSTITUTE, Daejeon (KR)

(72) Inventors: Tae Sang Choi, Sejong-si (KR); Tae Yeon Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 18/213,986

(22) Filed: Jun. 26, 2023

(65) Prior Publication Data

US 2024/0204992 A1  Jun. 20, 2024

(30) Foreign Application Priority Data

Dec. 19, 2022  (KR) .......................... 10-2022-0178637

(51) Int. Cl.
H04L 9/08  (2006.01)
(52) U.S. Cl.
CPC ................... H04L 9/0852 (2013.01)
(58) Field of Classification Search
CPC ............... H04L 9/0852; H04L 41/5019; H04L 41/0894; H04L 41/5003; H04L 41/50; G06N 20/00
See application file for complete search history.

(56) References Cited

U.S. PATENT DOCUMENTS

| | | | |
|---|---|---|---|
| 11,190,347 B2 | 11/2021 | Zhao et al. | |
| 11,868,338 B2* | 1/2024 | Paracha | H04L 9/3239 |
| 11,868,460 B2* | 1/2024 | Hunt | G06F 21/44 |
| 11,941,442 B1* | 3/2024 | Lenchner | G06F 9/44536 |
| 11,991,271 B2* | 5/2024 | Zhang | H04L 9/0625 |

(Continued)

FOREIGN PATENT DOCUMENTS

| | | |
|---|---|---|
| KR | 10-2018-0041190 A | 4/2018 |
| WO | 2017/031228 A1 | 2/2017 |

OTHER PUBLICATIONS

Taesang Choi et al., Draft Recommendation ITU-T Y.3811 (formerly Y.QKDN_QOS_fa:) "Quantum key distribution networks—Functional architecture for quality of service assurance", International Telecommunication Union, SG13-TD66/WP1, Geneva, Jul. 4-15, 2022.

*Primary Examiner* — Hosuk Song
(74) *Attorney, Agent, or Firm* — LRK PATENT LAW FIRM

(57) ABSTRACT

An apparatus for evaluating the quality of digital human content included in a source input are disclosed. The apparatus includes a first entity determines a provisioning plan based on available resources matching a service level agreement (SLA)-based user's provisioning request. The apparatus further includes a second entity provision resources of the QKDN based on the provisioning plan, and re-provision the provisioned resources in response to receiving a re-provisioning request or a re-optimization request for the provisioned resources from other entities.

14 Claims, 9 Drawing Sheets

(56) References Cited

U.S. PATENT DOCUMENTS

| | | | |
|---|---|---|---|
| 11,991,273 B2 * | 5/2024 | Sheppard | H04L 9/083 |
| 12,160,511 B2 * | 12/2024 | Anand | H04L 9/0836 |
| 12,212,491 B2 * | 1/2025 | Atwal | H04B 7/18519 |
| 2014/0101316 A1 | 4/2014 | Lee et al. | |
| 2017/0126792 A1 | 5/2017 | Halpern et al. | |
| 2018/0145880 A1 | 5/2018 | Choi et al. | |
| 2021/0258866 A1 | 8/2021 | Chou | |

* cited by examiner

METHOD AND DEVICE FOR QoS ASSURANCE OF QUANTUM KEY DISTRIBUTION NETWORK BASED ON MACHINE LEARNING AND AUTONOMIC LIFE CYCLE MANAGEMENT

CROSS REFERENCE TO RELATED APPLICATION

The present application is based on and claims the benefit of priority to Korean Patent Application Number 10-2022-0178637, filed on Dec. 19, 2022 in the Korean Intellectual Property Office, the entire disclosure of which is incorporated herein by reference.

BACKGROUND

1. Technical Field

The present disclosure relates to a device and method for QoS assurance based on machine learning and autonomous lifetime management of a quantum key distribution network.

2. Description of Related Art

The statements in this section merely provide background information related to the present disclosure and may not constitute prior art.

Quantum key distribution (QKD) is a technology for distributing and sharing quantum keys between remote users based on quantum physics, and can prevent an attacker from eavesdropping and allow a quantum key to be shared between a sender and a receiver. For example, the QKD can be defined as a procedure or method for generating and distributing symmetric encryption keys with information theoretic security based on a quantum information theory.

A quantum key distribution network (QKDN) corresponds to a technology for applying a QKD cryptosystem to a general communication network. For example, the QKDN can be defined as a network including two or more QKD nodes connected through a QKD link.

Recently, requirements, functional structures, reference points, hierarchical SDN controllers, overall operating procedures, controllable elements, and security considerations for software defined networking (SDN)-based control in the QKDN are being discussed. The SDN can be defined as a set of technologies that enable direct programming, orchestration, control and management of network resources, and can allow network services to be designed, delivered and operated in a dynamic and scalable manner.

Services based on the QKDN may have related quality of service (QOS) criteria that should be satisfied in order to provide a desired level of quality at a reception device. Typically, QoS criteria are described in a Service Level Agreement (SLA) between a service provider and a service user. Configuring a network system for satisfying QoS requirements desired by the user can be very complex. In particular, in order to evaluate the QoS provided to the service user, it is necessary to analyze a lot of the QoS data and perform resource provisioning based on analysis results.

However, unstable workload prediction and static resource provisioning in the related art cause under-utilization or over-utilization of cloud resources, thereby wasting costs or failing to appropriately assure service performance.

Therefore, it is necessary to study a method for efficiently providing services with QoS desired by users in the QKDN.

SUMMARY

According to at least one embodiment, the present disclosure provides a quality of service (QOS) assurance device for a quantum key distribution network (QKDN). The QoS assurance device comprises a first entity comprising a first processor and a first memory configured to store first instructions executable by the first processor to cause the first entity to determine a provisioning plan based on available resources matching a service level agreement (SLA)-based user's provisioning request. The QoS assurance device further comprises a second entity comprising a first processor and a first memory configured to store first instructions executable by the first processor to cause the first entity to provision resources of the QKDN based on the provisioning plan, and re-provision the provisioned resources in response to receiving a re-provisioning request or a re-optimization request for the provisioned resources from other entities According to another embodiment of the present disclosure, a computer-implemented method for assuring quality of service (QOS) of a quantum key distribution network (QKDN) is provided. The method comprises determining, by a first entity, a provisioning plan based on available resources matching a service level agreement (SLA)-based user's provisioning request. The method further comprises. The method further comprises provisioning, by a second entity, resources of the QKDN based on the provisioning plan. The method further comprises re-provisioning, by the second entity, the provisioned resources in response to receiving a re-provisioning request or a re-optimization request for the provisioned resources from other entities

DETAILED DESCRIPTION

Figure 1:
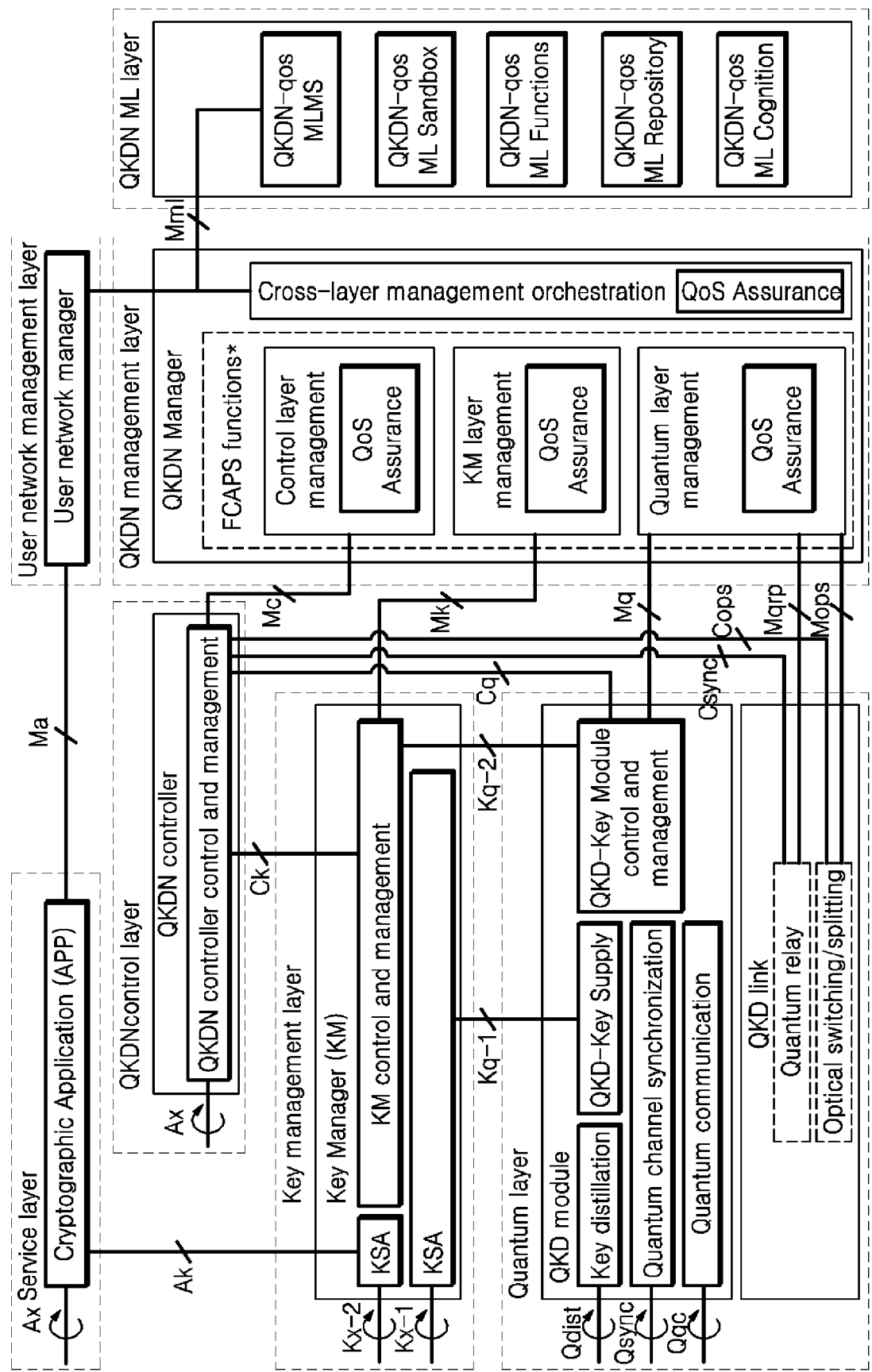
FIG. 1 is a diagram illustrating layers required for QOS assurance of the QKDN according to an embodiment of the present disclosure.

An object of the present disclosure is to provide a QoS assurance method and device for autonomously managing a QoS life cycle in a QKDN.

An object of the present disclosure is to provide a QoS assurance method and device for efficiently managing a life cycle based on machine learning in the QKDN.

The problems to be solved by the present invention are not limited to the problems mentioned above, and other problems not mentioned will be clearly understood by those skilled in the art from the following description.

Embodiments of the present disclosure are described below in detail using various drawings. It should be noted that when reference numerals are assigned to components in each drawing, the same components have the same reference numerals as much as possible, even if they are displayed on different drawings. Furthermore, in the description of the present disclosure, where it has been determined that a specific description of a related known configuration or function may obscure the gist of the disclosure, a detailed description thereof has been omitted.

In describing the components of the embodiments according to the present disclosure, symbols such as first, second, i), ii), a), and b) may be used. These symbols are only used to distinguish components from other components. The identity or sequence or order of the components is not limited by the symbols. In the specification, when a part "includes" or is "equipped with" an element, this means that the part may further include other elements, not excluding other elements unless explicitly stated to the contrary. Further, when an element is described as being "for" performing or carry out a stated function, step, set of instructions, or the like, the element may also be considered as being "configured to" do so.

Each component of a device or method according to the present disclosure may be implemented in hardware or software, or in a combination of hardware and software. In addition, the functions of each component may be implemented in software. A microprocessor or processor may execute functions of the software corresponding to each component.

Reference is made to the following documents for background description, definitions of terms and abbreviations in connection with the present invention.

ITU-T P.10: Vocabulary for performance and quality of service.
ITU-T Q.1741.9: IMT-2000 references to Release 11 of GSM evolved UMTS core network.
ITU-T Y.3800: Overview on networks supporting quantum key distribution.
ITU-T Y.3801: Quantum key distribution networks— Functional requirements
ITU-T Y.3802: Quantum key distribution networks— Functional architecture
ITU-T Y.3803: Quantum key distribution networks—Key management
ITU-T Y.3804: Quantum key distribution networks— Control and management
ITU-T Y.3806: Quantum key distribution networks— Requirements for quality of service assurance
ITU-T Y.3807: Quantum key distribution networks—QoS parameters
ITU-T Y.3811: Quantum key distribution networks— Functional architecture for quality of service assurance
ITU-T Y.3812: Quantum key distribution networks— Requirements for machine learning based quality of service assurance
ITU-T Y.3814: Quantum key distribution networks— functional requirements and architecture for machine learning enablement A quantum key distribution network (QKDN) can support various quantum key distribution services.

One of problems to be solved in quantum key distribution technology is to satisfy requirements of network performance and various quality of service (QOS)/quality of experience (QoE) in various application scenarios. In particular, the program is to assure key performance indicators including latency, accuracy, throughput, and availability for each service (Key Performance Indicator, KPI) in order to support various application services of the QKDN with large scale and high complexity.

In order to solve such a technical problem, the present disclosure describes a machine learning and self-management function-based functional architecture for assuring QoS of the QKDN, detailed functional entities, and an operating procedure.

FIG. 1 is a diagram illustrating layers required for QOS assurance of the QKDN according to an embodiment of the present disclosure.

Referring to FIG. 1, an exemplary functional structure of SDN control based on the structure of a predefined quantum key distribution network (QKDN).

The entire network includes a user network and the QKDN. The user networks include applications such as an encryptor and a decryptor. The QKDN includes QKD nodes containing QKD devices, a quantum relay point or optical switch/splitter connecting the QKD nodes.

The user network includes a service layer and a user network management layer.

The service layer uses shared key pairs provided by the QKDN and performs secure communication. A cryptographic application of the service layer can utilize a shared key pair provided by the QKDN and perform encrypted communications between remote parties. The cryptographic application may be initiated and served by a QKDN controller. Three representative cryptographic applications of the service layer are a point-to-point application, a point-to-multipoint application, and a multipoint-to-multipoint application.

The user network management layer performs a FACPS (fault, configuration, accounting, performance, security) function of the user network.

A structure of the QKDN may include various entities such as a QKDN control layer, a key management layer (KML), a quantum layer (QL), a QKDN management layer, and a QKDN machine learning layer (QKDN ML layer).

Functional elements of the quantum layer include a QKD link and a QKD-module, and can be enabled to easily communicate with a QKDN controller. Parameters regarding quantum layers such as quantum key generation rate, transmit power, and reception power may be adjusted by a QKDN controller of the QKDN control layer.

Functions of the QKD link may include an optical switching/splitting function, a quantum relay function, and the like. Functions of the QKD module are key distillation, a quantum channel synchronization function, quantum communication, a QKD-Key supply function, a random number generation (RNG) function, a channel multiplexing function, a QKD module control and management function, and the like.

Functional elements of the key management layer include a key manager (KM), and the key manager includes a key management agent (KMA), a key supply agent (KSA), and key management control and management (KM control and management) block, and may exchange messages for control and management with the QKDN controller. Functions of the KMA may include a key relay function, a key storage function, a key life cycle management function, and the like. Function of the KSA includes a key supply function and may further include a key combination function.

Functional elements of the QKDN control layer may include a QKDN controller. The QKDN controller can control various resources for assuring security, stability, efficiency, and robustness of an operation of the QKDN.

Here, the resources are elements constituting QKDN. The resources include at least one of a switch, a router, a quantum node capable of generating quantum cryptography keys, a key storage device for storing and managing keys, a transmission device for key transmission, and a control server or management server for controlling and managing the devices.

The functions of the QKDN controller include a routing control function, a configuration control function, an access control function, a session control function, a policy based control function, and a QKDN controller control and management function.

Elements of the QKDN management layer may communicate with the QKDN controller to acquire setting and management information. The QKDN management layer includes a QKDN manager, and functions of the QKDN manager include a FACPS (fault, configuration, accounting, performance, security) function and a cross-layer management orchestration function. The FACPS function may include a control layer management (CM) function, a key management layer management (KM) function, a quantum layer management (QM) function, and the like. The control layer management function, the key management layer management function, the quantum layer management function, and the cross-layer management orchestration function all include a QoS assurance function.

A failure management function of the QKDN management layer is to detect, diagnose, and resolve failures of QKDN resources. In addition, the failure management function supports routing and rerouting control of a key relay of the QKDN controller. A configuration management function of the QKDN management layer manages provisioning of the QKDN resources, collects and manages a topology, and manages provisioning, configuration and discovery of resources. A configuration management function also supports provisioning of key relay paths in the QKDN controller. A management accounting management function of the QKDN management layer supports key provisioning services and charging to determine a cost of keys used by a cryptographic application. A performance management function of the QKDN management layer monitors and analyzes a performance status of the QKDN resources, and supports QoS assurance, QoS policy management, and visualization of QKDN performance information. A security management function of the QKDN management layer collects security-related management information from the QKDN, supports key life cycle management, and manages authority and authentication in the QKDN.

Functional elements of the QKDN machine learning layer may include a machine learning modeling (QKDN-qos MLMS) function, a machine learning sandbox (QKDN-qos ML Sandbox), a machine learning function (QKDN-qos ML Functions), a machine learning storage (QKDN-qos ML repository) function, a machine learning cognition (QKDN-qos ML cognition) function, and the like. Machine learning models generated by the QKDN machine learning layer may be used for prediction of QoS-related anomalies, evaluation of QoS-related data, static parameter tuning in a quantum layer and a key management layer, dynamic feedback, determination of key relay paths, QoS parameter measurement of a QoS enforcement policy, or reconfiguration of a QKD module, QKD link, KM, and KM link.

Meanwhile, information exchange between components in the QKDN structure can be performed through logical interfaces between layers, functional elements, and entities defined as reference points. For example, the reference point between the QKDN controller of the QKDN control layer and a KM control and management function of a KM layer may be defined as Ck. The reference point Ck may serve for the QKDN controller to communicate control information with the KM control and management function.

According to an embodiment of the present disclosure, a device for QoS assurance of the QKDN may include a QKDN management layer, a QKDN machine learning layer, and an interface between the two layers.

Figure 2:
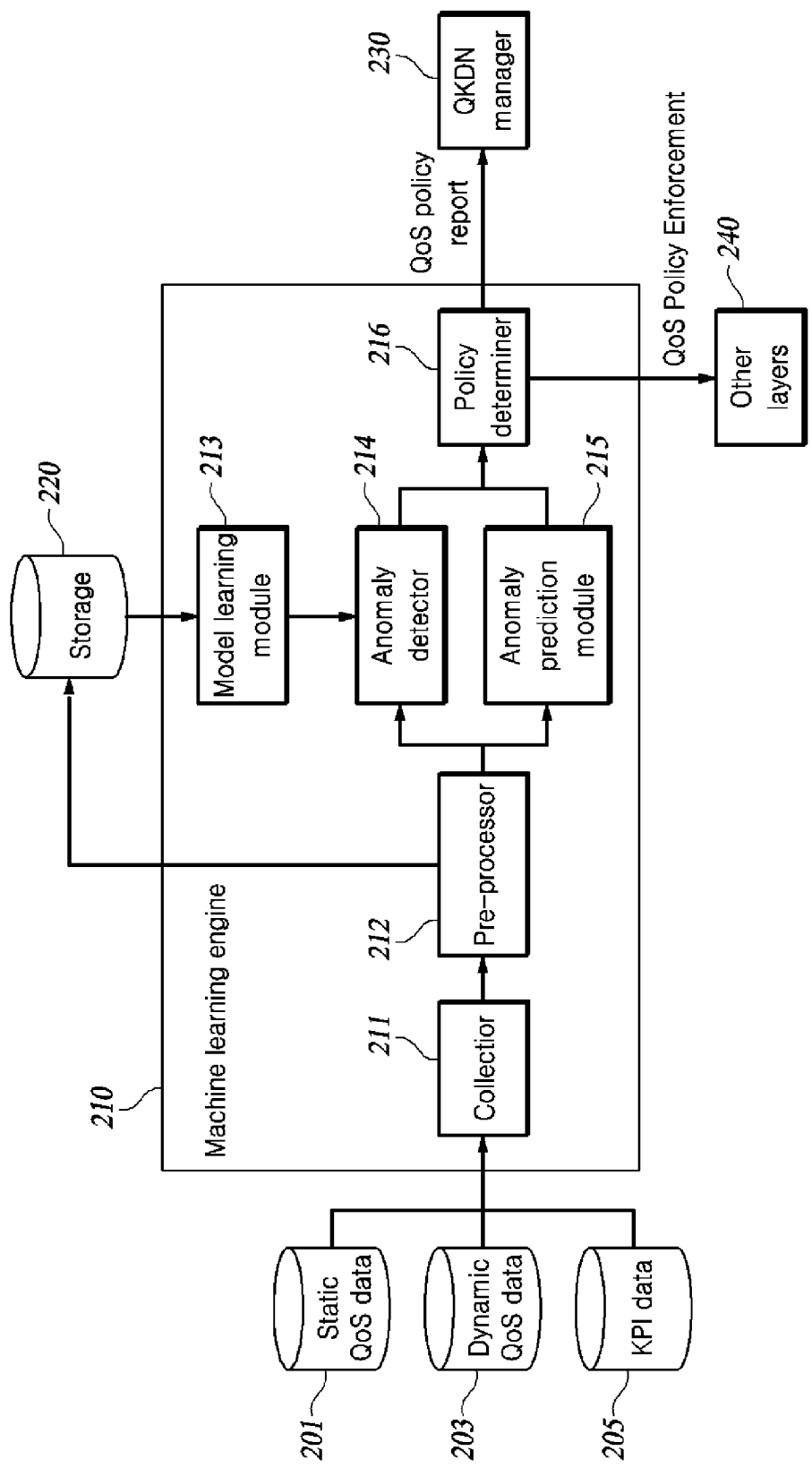
FIG. 2 is a diagram illustrating an example of utilization of a QKDN machine learning model according to an embodiment of the present disclosure.

FIG. 2 is a diagram illustrating an example of utilization of a QKDN machine learning model according to an embodiment of the present disclosure.

Referring to FIG. 2, the QKDN machine learning layer may detect or predict a QoS anomaly and determine a QoS policy using the machine learning engine 210. In another embodiment, the QKDN machine learning layer can create and train machine learning models, and the QKDN management layer can use the trained machine learning models.

In the present disclosure, the machine learning model is a deep learning model and may have a neural network structure. The machine learning model may be any one of a recurrent neural network (RNN), a convolution neural network (CNN), and a deep neural network (DNN). In particular, since the QoS data is multidimensional time series data, the machine learning model may have an RNN structure. Otherwise, the machine learning model can be a combination of the CNN, the RNN, and the DNN.

The machine learning engine 210 includes a collection unit 211, a preprocessing unit 212, a model learning unit 213, an anomaly detection unit 214, an anomaly prediction unit 215, and a policy decision unit 216.

The collection unit 211 collects the QoS data on the QKDN. Here, the QoS data includes static QoS data 201, dynamic QoS data 203, and KPI data 205.

The preprocessing unit 212 preprocesses the QoS data collected by the collection unit 211 for learning of the machine learning model. The preprocessed QoS data constitutes training data of the machine learning model. The training data further includes a label for the QoS data. The label data may be information on whether the preprocessed QoS data includes anomaly. Here, the anomaly include QoS-related anomaly and security anomaly. The QoS-related anomaly represents a network node that does not satisfy QoS requirements according to an SLA due to disconnection or network congestion, and a status of the network node. The security anomaly refers to a network node that fails to satisfy the QoS requirements according to the SLA by a third party and a state of the network node.

The preprocessing unit 212 may remove and filter noise data from QoS raw data. The preprocessing unit 212 may normalize and integrate the QoS data.

The QoS requirements include throughput, KSA-key response delay (KKRD), KSA-key response delay variation (KKRDV), and KSA-key delivery error rate (KKDER), KSA-key delivery loss ratio (KKDLR), and availability and service storage time.

When the resources of the QKDN are provisioned, the training data may further include a provisioning status together with the QoS data.

The QoS data preprocessed by the preprocessing unit 212 is stored in a storage unit 220. The storage unit 220 stores history QoS data.

The model learning unit 213 generates a machine learning model and trains the machine learning model to detect anomalies from the preprocessed QoS data. The machine learning model is trained to identify a node at which an anomaly has occurred and a state of the node based on the preprocessed QoS data.

The model learning unit 213 may supervise a machine learning model. Specifically, the model learning unit 213 inputs preprocessed QoS data to the machine learning model, acquires information on a node in which an anomaly occurs among nodes in the QKDN from the machine learning model, compares anomaly information labeled for the preprocessed QoS data with the acquired information, and updates parameters of the machine learning model according to a result of the comparison.

In another embodiment, the model learning unit 213 may use unsupervised learning or self-supervised learning.

Further, the model learning unit 213 may train other machine learning models to predict anomalies from the preprocessed QoS data, as described above.

The anomaly detection unit 214 may detect anomalies from the QoS data using a trained anomaly detection model.

The anomaly prediction unit 215 may predict anomalies from the QoS data using a trained anomaly prediction model.

The policy decision unit 216 decides a policy for solving the QoS anomaly when an anomaly is detected or an anomaly is predicted. That is, the policy decision unit 216 may decide a policy for removing the anomaly or a policy for preventing the anomaly from being predicted.

The policy decision unit 216 reports the decided policy to the QKDN manager 230 and provides the policy so that the policy can be enforced in other layers 240. Here, the other layers 240 include a quantum layer and a key management layer. The delivered policy applies to the QKDN.

On the other hand, the model learning unit 213 may further train a machine learning model for identifying the node requiring the re-provisioning among the nodes in the QKDN from time-series data including the provisioning status and the QoS data for resources, and a machine learning model that identifies the nodes requiring the re-optimization among the node in the QKDN from the time-series data. Further, the model learning unit 213 further trains a machine learning model that outputs a network coverage to which the SLA is applied, capacity, and resource requirements, from available resources, traffic estimates, network topology, control and user data, and entity information.

Figure 3:
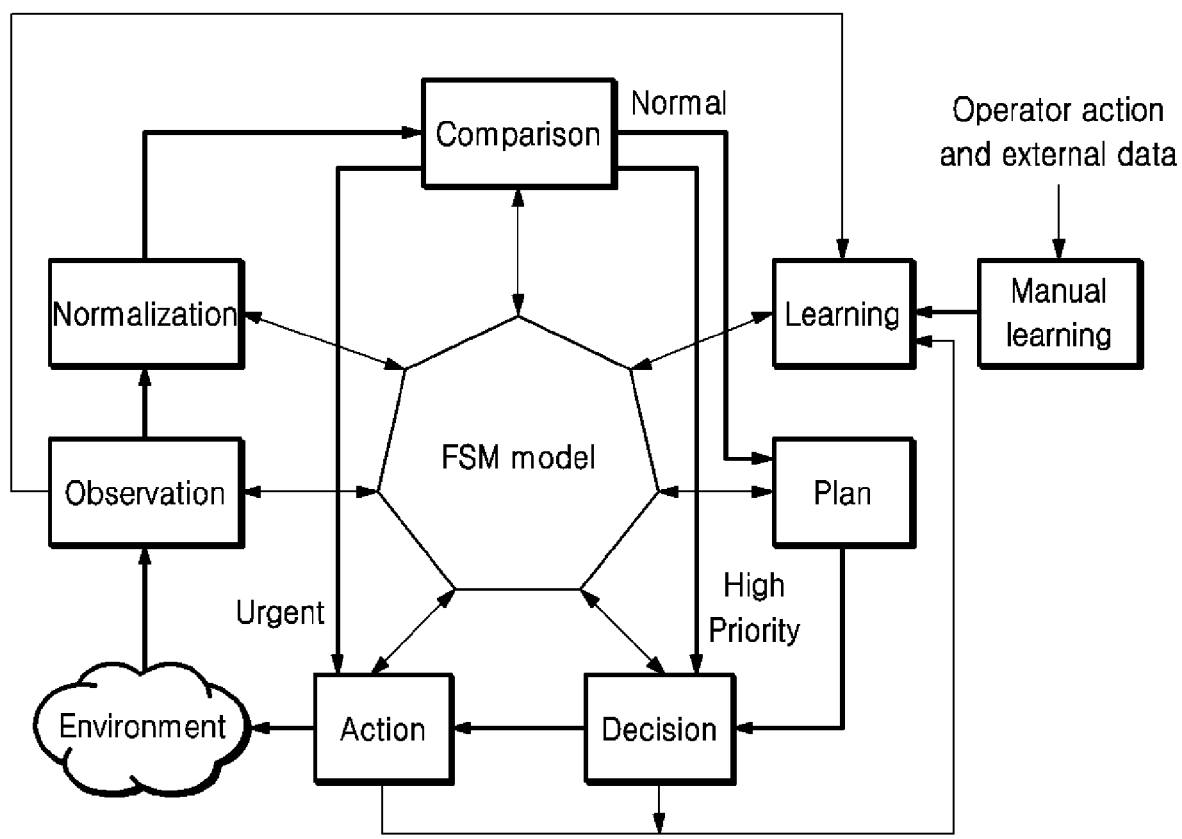
FIG. 3 is a diagram illustrating a process of a machine learning layer according to an embodiment of the present disclosure.

FIG. 3 is a diagram illustrating a process of the machine learning layer according to the embodiment of the present disclosure.

Referring to FIG. 3, the machine learning layer performs an observing function, a normalizing function, a learning function, a comparing function, a planning function, a decision function, and an action function.

Referring to FIGS. 2 and 3 together, the observation function corresponds to an operation of the collection unit 211. The normalization function corresponds to an operation of the preprocessing unit 212. The learning function corresponds to an operation of the model learning unit 213. The comparison function, the planning function, and the decision function correspond to operations of the anomaly detection unit 214, the anomaly prediction unit 215, and the policy decision unit 216.

The machine learning layer may classify the importance of a QoS abnormality phenomenon into urgent, high-priority, and normal, and perform various countermeasures according to the importance.

Thus, the machine learning layer can autonomously manage the life cycle based on a closed-loop management process. Accordingly, manual intervention by a worker is significantly reduced.

Figure 4:
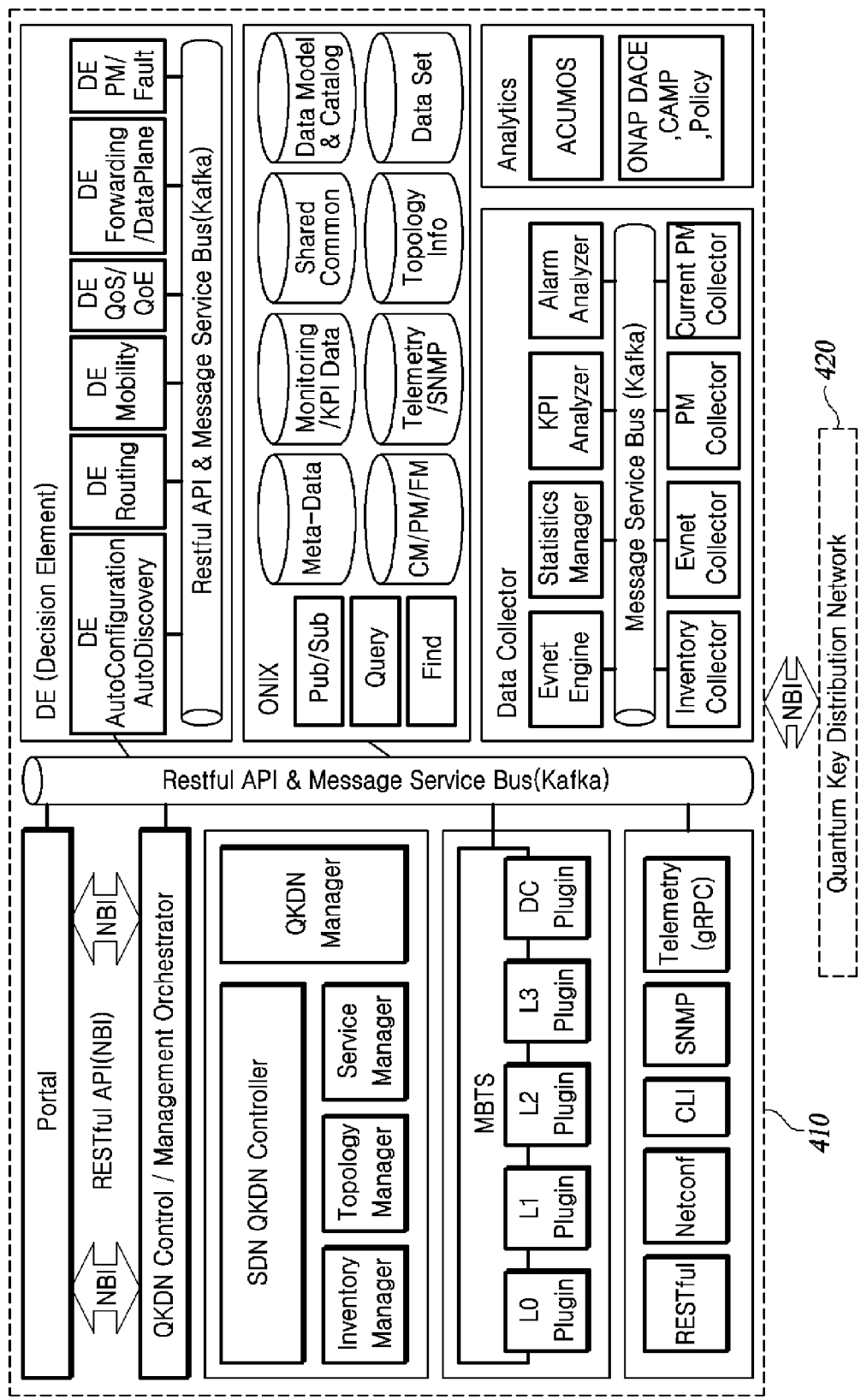
FIG. 4 is an exemplary diagram illustrating a QoS assurance device according to an embodiment of the present disclosure.

FIG. 4 is an exemplary diagram illustrating a QoS assurance device according to an embodiment of the present disclosure.

Referring to FIG. 4, the QoS assurance device 410 includes a data collector, an analytics function, an Open Network Information exChange (ONIX) function, a decision element (DE) function, a QKDN control/management orchestrator, a QKDN SDN controller, a QKDN manager, a MBTS (model based translation service) function, and a customer portal function. The QoS assurance device 410 is connected to the QKDN 420 through a south bound interface (SBI).

The data collector collects performance information of the quantum layer for QoS management, performance information of the key management layer, key routing information, and topology information of the QKDN 420 from the QKDN 420. The data collector includes an event engine, a statistics manager, a kpi analyzer, ab alarm analyzer, an inventory collector, an event collector, a pm collector, a current pm collector, and a message service bus.

The analytics function performs an analysis function such as filtering, aggregation, and normalization based on collected information. The analytics function includes ACUMOS, ONAP DACE, CAMP, and a policy.

The ONIX functions perform a distributed repository function by distributing and storing the collected information and analysis results so that these can be used in other modules. The ONIX functions include a pub/sub function, a query function, and a finding function.

The decision element function decides a policy related to QoS assurance, such as QoS failure, performance degradation, and quantum cryptographic key routing, based on a pre-trained model. The decision element function includes an auto-configuration function, an auto-discovery function, a routing function, a mobility function, a QoS/QoE function, a forwarding/dataplane function, a PM/fault function, and dynamic programming.

The QKDN control/management orchestrator performs an orchestration function to apply the policy of the decision element function to related the resources of the QKDN 420. To this end, the QKDN control/management orchestrator coordinates with the QKDN SDN controller and the QKDN manager.

The MBTS (model based translation service) function provides a function of converting equipment-dependent data into non-dependent data, for independent control and management of various types of equipment in the key management layer and the quantum layer to which a QoS policy is applied. The MBTS function include an L0 plug-in, L1 plug-in, L2 plug-in, L3 plug-in, and DC plug-in. The MBTS function can be interworked with a RSTful function, an Netconf function, a CLI function, an SNMP function, and a telemetry function.

The SBI provides an interface necessary for equipment-specific communication in the MBTS function, and a North Bound Interface (NBI) provides an interface necessary for communication between the QKDN control/management orchestrator and the customer portal.

The customer portal function provides a window function so that a customer can conveniently access a QoS assurance function of the QKDN 420.

Figure 5:
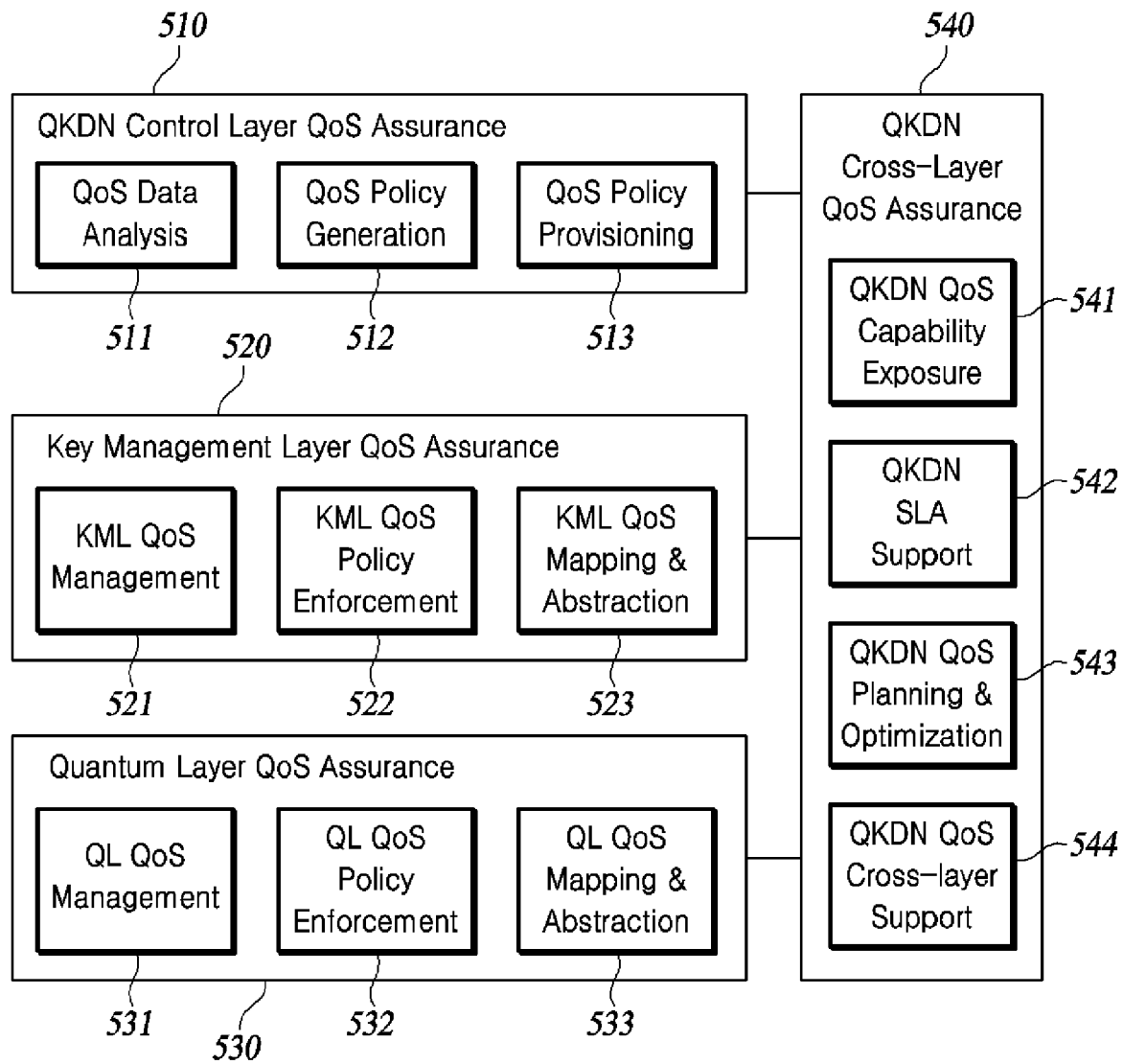
FIG. 5 is a configuration diagram of the QKDN management layer according to an embodiment of the present disclosure.

FIG. 5 is a configuration diagram of the QKDN management layer according to an embodiment of the present disclosure.

Referring to FIG. 5, the QKDN management layer includes a QKDN Control Layer QoS Assurance (QCLQA) entity 510, a Key Management Layer QoS Assurance (KMLQA) entity 520, a Quantum Layer QoS Assurance (QLQA) entity 530, and a QKDN Cross-Layer QoS Assurance (QCRQA) entity 540.

The QCLQA entity 510 includes a QoS Data Analysis (QDA) entity 511, a QoS Policy Generation (QPG) entity 512, and a QoS Policy Provisioning (QPP) entity 513.

The KMLQA entity 520 includes a KML QOS Measurement (KQM) entity 521, a KML QoS Policy Enforcement (KQPE) entity 522, and a KML QoS Mapping & Abstraction (KQMA) entity 523.

The QLQA entity 530 includes a QL QoS Measurement (QQM) entity 531, a QL QoS Policy Enforcement (QQPE) entity 532, and a QL QoS Mapping & Abstraction (QQMA) entity 533.

The QCRQA entity 540 includes an QKDN QoS Capability Exposure (QQCE) entity 541 for an external management system, a QKDN SLA Support (QSS) entity 542, a QKDN QOS Planning and Optimization (QQPO) entity 543, and a QKDN QoS Cross-Layer Support (QQCLS) entity 544. Here, the SLA is a Service Level Agreement.

Hereinafter, functional elements of each entity will be described.

The QDA entity 511 of the QCLQA entity 510 receives QoS-related information from the KQM entity 521 and the QQM entity 531, and performs analysis for QoS assurance. For example, the QDA entity 511 may analyze a correlation between QoS information and QoS anomalies. The QoS-related information includes at least some of the information collected by the KQM entity 521 and the QQM entity 531.

In particular, the QDA entity 511 can detect QoS-related anomalies that can be utilized to achieve QoS assurance of the QKDN based on the analysis result. The QDA entity 511 receives time-series data including a QKDN the provisioning status and the QoS data, and uses a pre-trained machine learning model to acquire a network node in which QoS-related anomalies occur and a status of the node, and a network node in which security anomalies occur and a status of the node from time-series data. The QDA entity 511 may request provisioning policy determination or resource provisioning by notifying the QQPO entity 630 or the QPP entity 640 of the occurrence of the anomalies.

The QDA entity 511 can estimate quantum channel performance, such as noise, secret key rate, and quantum bit error rate, from the QoS data. When the quantum channel with the best transmission performance is selected based on the prediction results, it is possible to reduce an influence of noise and improve QoS.

The QPG entity 512 generates a QoS policy for assuring the quality of QKDN services based on the analysis result of the QDA entity 511. The QoS policy may include a KML QoS policy and a QL QoS policy. The QoS policy is transmitted to the entities performing a QoS enforcement function of each layer so that the QoS policy is enforced in an environment of KML or QL. Here, the QoS enforcement entities include the KQPE entity 522 and the QQPE entity 532.

The QPP entity 513 converts the QoS policy into specific resource-oriented QoS rules in KML and specific resource-oriented QoS rules in QL. The converted rules can be used for QoS assurance control, QoS interworking and mapping, and efficient end-to-end (E2E) QoS provisioning. The QPP entity 513 may perform triggering so that a QoS policy enforcement entity at each layer completes the provisioning process. In addition, the QPP entity 513 may perform verification on whether provisioning is performed according to a goal according to the SLA.

The KQM entity 521 may collect static information of physical or virtual resources of KML. The static information includes, for example, a name, position, IP address, and date of manufacture of the resource. In addition, the KQM entity 521 may monitor and collect dynamic information including configuration, fault, performance, and security events of the KML. The KQM entity 521 may collect KML performance data regarding various KPIs such as KMA link delay, KSA link delay, and loss ratio throughput. The KQM entity 521 may transmit information to the QDA entity 511 for sequential processing.

The KQPE entity 522 may enforce the KML QoS policy received from the QCLQA entity 510. The KQPE entity 522 may focus on queue management related to KML links, including KMA links and KSA links. An important goal of the queue management is to minimize a size of a steady-state queue while sufficiently using links, as well as preventing a lock-out phenomenon in which a single connection or flow monopolizes a queue space. Specifically, the QoS enforcement function of the KQPE entity 522 may include packet marking, congestion avoidance, queue shaping, and queue scheduling up to fine QoS units (for example, per-flow). Queue management systems may differ primarily in terms of packet drop and packets to be dropped. For example, when a plurality of queues are used, a scheme of distributing packets between the queues may be diversified. The KQPE entity 522 may utilize a weighted random early detection (WRED) queue management algorithm, and a priority queuing (PQ) and weighted round-robin (WRR) queue scheduling algorithm.

The KQMA entity 523 can be used to support appropriate QoS interworking between networks in which packets traverse different network domains. For example, there is an operation of mapping a KM access network QoS class to a KM backbone network QoS class. Here, the QoS class may be associated with three attributes including a priority, a packet delay budget, and a packet error loss ratio.

The QQM entity 531 may collect static information of physical or virtual resources of the QL. The static information includes a name, position, IP address, date of manufacture, or the like of the resources. Further, the QQM entity 531 may monitor and collect dynamic information of a configuration, error, performance, and security event of the QL. Specifically, the QQM entity 531 may collect various QL performance pieces of data regarding the KPI such as QKER, QKLR, flow rate, secure key rate, maximum secure distance, QBER, phase error rate, or operation frequency. The QQM entity 531 may transmit the collected information to the QDA entity 511 for sequential processing.

The QQPE entity 532 may enforce a QL QoS policy received from the QCLQA entity 510. The QQPE entity 532 may focus primarily on the queue management related to the quantum channel and the classical channel. An important goal of the queue management is to minimize a size of a steady-state queue while sufficiently using links, as well as preventing a lock-out phenomenon in which a single connection or flow monopolizes a queue space. Specifically, the QOS enforcement function of the QQPE entity 532 may include packet marking, congestion avoidance, queue shaping, and queue scheduling using fine QoS units. Queue management systems may differ primarily in terms of packet drop and packets to be dropped. For example, when a plurality of queues are used, a scheme of distributing packets between the queues may be diversified. The QQPE entity 532 may utilize a WRED queue management algorithm, and a PQ and WRR queue scheduling algorithm.

The QQMA entity 533 can be used to support appropriate QoS interworking between networks in which packets traverse different network domains. For example, there is an operation of mapping a quantum access network QoS class to a quantum backbone network QoS class. Here, the QoS class may be associated with three attributes including priority, packet delay tolerance, and packet error loss ratio.

On the other hand, static information, dynamic information, and performance data of the KQM entity 521 and the QQM entity 531 include the static QoS data 201, the dynamic QoS data 203, and the KPI data 205 in FIG. 2, respectively. For example, the static QoS data 201 represents QoS-related information among static information of the KQM entity 521 and the QQM entity 531.

The QQCE entity 541 opens QOS capabilities of the QKDN. Opening of the QKDN QOS capabilities can provide new business opportunities to QKDN operators, suppliers, QKDN enterprises or value-added operators. All QoS functions and capabilities can be accessed through a service-based interface including service registration, service search, service request, and service registration cancel.

The SLA is a formal contract that is agreed between QKDN service users and a QKDN provider after negotiation of service characteristics, responsibilities, and priorities. The SLA can include not only performance quality, charging, and provided services, but also legal and economic conditions. The SLA is from the user and service perspective, whereas the QoS policy is from the network perspective. The QSS entity 542 may receive an SLA from a QKDN user, extract the QoS requirements such as performance and service provision conditions from the SLA, and convert the QoS requirements into a QoS policy.

The QQPO entity 543 may receive actual QL and KML traffic estimates and topology, an accurate model utilization for transmission of control data and user data (for example, key information), actual QKDN functional entity characteristics, functions, and parameters, and information on implementation from QL management (QM) function, KML management (KM) function, and CL management (CM) function entities. The QQPO entity 543 may provide estimates of a coverage, capacity, and resource requirements of the QKDN based on the received information.

In particular, the QQPO entity 543 may acquire the estimates of the coverage, capacity, and resource requirements of the QKDN using a first pre-trained machine learning model. Specifically, the first machine learning model is trained to output output training data including the estimates of the coverage, capacity and resource requirements of the QKDN according to the SLA from time-series training data including QL and KML traffic estimates, topology, model information for transmission of control and user data, and information of entities of the QKDN. The QQPO entity 543 acquires output data including network coverage, capacity, and resource requirements according to the SLA from time-series data including available resources in the QKDN, traffic estimates and topology of the QL and KML, control and user data, and entity information of the QKDN. The QQPO entity 543 may determine a provisioning policy based on the acquired output data. Thus, the QQPO entity 543 can accurately and efficiently obtain network information to which the SLA is applied, from complex data.

The QQPO entity 543 may update QoS planning results based on the estimates so that overall QKDN quality and user QoE are improved, and the QKDN resources are efficiently utilized. QoS estimation and optimization results can be realized through a QoS provisioning process.

A series of planning and optimization functions of the QQPO entity 543 can be executed autonomously based on the self-management function described in FIG. 4. Accordingly, it is possible to minimize intervention and mistake of a manual worker, and to improve the accuracy, reliability, and efficiency of an overall process for QoS assurance of the QKDN.

The QQCLS entity 544 serves to manage a correlation of QOS information across QKDN layers. The QQCLS entity 544 may perform QoS provisioning, QoS-based key relay or rerouting analysis, and QoS-related anomaly and security anomaly analysis across several layers.

Here, the QQCLS entity 544 may perform anomaly detection and complex analysis tasks using the second machine learning model, like the QDA entity 511.

Figure 6A:
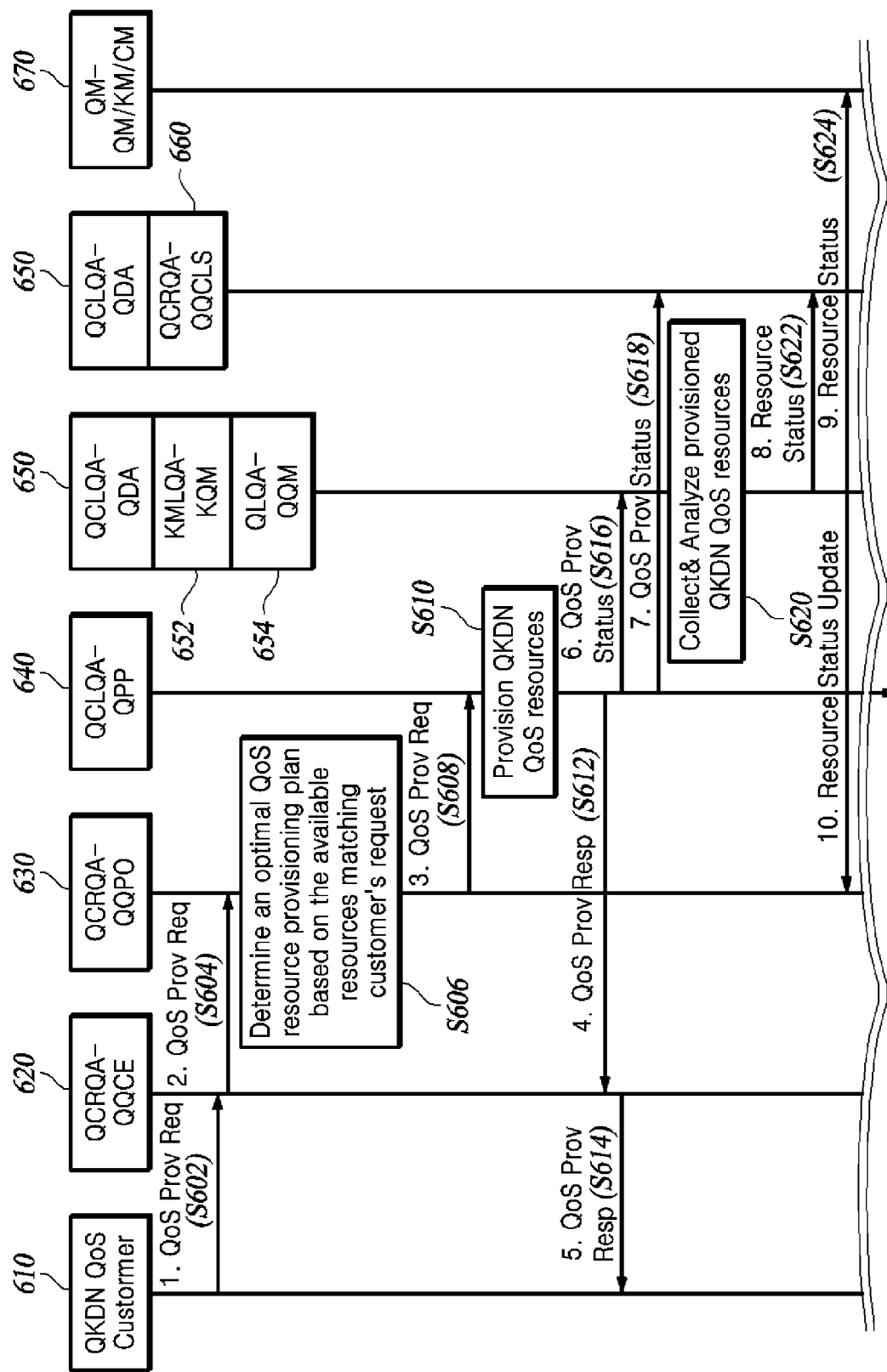
FIGS. 6A and 6B illustrate examples of lifecycle procedures for QoS assurance according to an embodiment of the present disclosure.
Figure 6B:
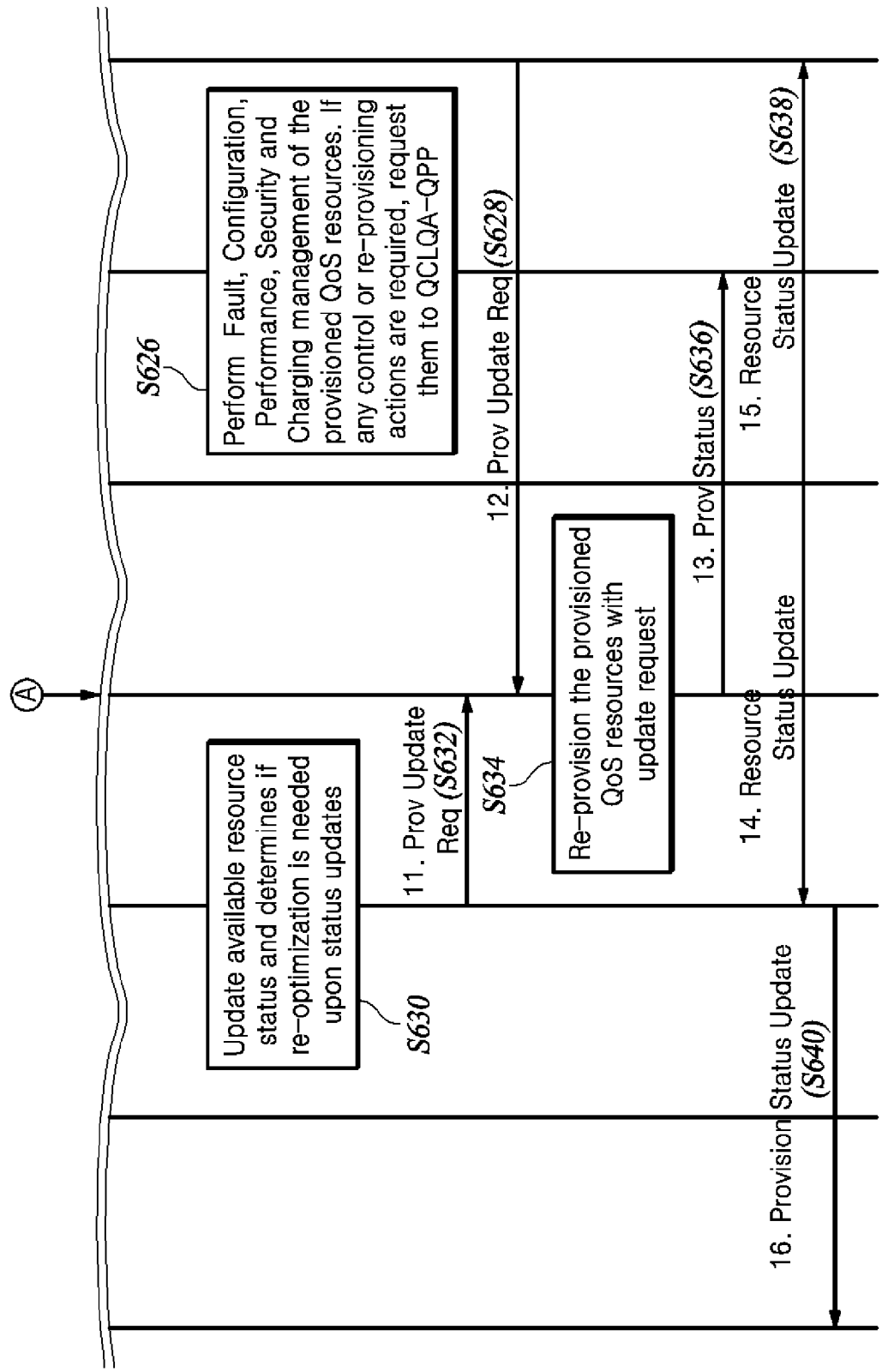

FIGS. 6A and 6B illustrate examples of lifecycle procedures for QoS assurance according to an embodiment of the present disclosure.

The QoS assurance lifecycle is included in lifecycles of the QKDN services. The QOS assurances of the QKDN include QoS planning, QoS monitoring, QoS optimization, QoS provisioning, and QoS recovery.

Referring to FIGS. 6a and 6b, in step S602, the QKDN QoS customer 610 transmits a QoS provisioning request (QOS Prov Req) to the QQCE entity 620 in the QCRQA entity. Specifically, the QKDN QoS customer 610, as a service user of the QKDN, may request the QKDN resources to be provisioned according to the QoS requirements designated based on an SLA between the QKDN user and the QKDN provider. The QKDN resources to be provisioned may include KML resources to be provisioned with a QoS enabled key relay route and the QoS requirements, and QL resources to be provisioned with the QoS requirements. The QQCE entity 620 may open a QoS function. The QSS entity (not illustrated) may provide QoS information for a QKDN QoS provision template including description of performance, charging, and service provision.

In step S604, the QQCE entity 620 receives the provisioning request and delivers the provisioning request (QOS Prov Req) to the QQPO entity 630 in the QCRQA entity.

In step S606, the QQPO entity 630 determines a QKDN QoS provisioning plan based on available resources matching the QoS provisioning request.

Since an amount of QoS-related information to be considered for a determination of the QoS policy is large and complex, the QQPO entity 630 may determine the QoS policy using a first machine-learned model.

In step S608, when the provisioning policy is determined, the QQPO entity 630 may transmit a QoS provisioning request (QOS Prov Req) to the QPP entity 640 within the QCQLA entity.

In step S610, the QPP entity 640 provisions QKDN QoS resources in response to the QoS provisioning request. The provisioning task includes a process of planning a range of a network, a size of resources, and the like, setting equipment so that the planned resources operate, and instructing the set equipment to start operating as resources. That is, the QPP entity 640 allocates resources. In this case, the QPP entity 640 may optimize the quality of a connection path, such as bandwidth and transmission delay, together with the number of equipment, position, and connection path. The optimization task can be performed in both a network construction step and a network operation step. The QKDN QoS provisioning task may include various sub-tasks related to QoS including QoS provisioning, QoS policy enforcement, QoS mapping, and the like.

In step S612, when the provisioning process is completed, the QPP entity 640 transmits a QoS provisioning response message (QoS Prov Resp) to the QQCE entity 620.

In step S614, the QQCE entity 620 transmits the QoS provisioning response message (QOS Prov Resp) to the QKDN QoS customer 610.

In step S616, the QPP entity 640 transmits QoS provisioning status to the QDA entity 650 in the QCLQA entity, a KQM entity 652 in the KMLQA entity, and a QQM entity 654 in the QLQA entity to start monitoring and analyzing the provisioned resources. Transmission of the QoS provisioning status (QOS Prov Status) to the QDA entity 650, the KQM entity 652, and the QQM entity 654 may be performed simultaneously.

In step S618, the QPP entity 640 transmits a QoS provisioning status (QOS Prov Status) to the QDA entity 650, and the QQCLS entity 660 in the QCRQA entity to store the provisioned resource information. The QDA entity 650 and the QQCLS entity 660 may include a resource repository that stores information on resource status. The resource repository may store basic datasets for training of a machine learning model, preprocessed data, past data, and further store a catalog of the machine learning model.

In step S620, the QDA entity 650, the KQM entity 652, and the QQM entity 654 may perform collection, monitoring, and analysis of the provisioned resources. Further, the QDA entity 650, the KQM entity 652, and the QQM entity 654 may also collect QoS related data. Information on the provisioned resources and the QoS data are stored in the QDA entity 650 and the QQCLS entity 660 for subsequent processing. Steps S616, S618, and S620 may be performed simultaneously or in reverse order.

In step S622, the QDA entity 650, the KQM entity 652, and the QQM entity 654 transmit a resource status to the QDA entity 650 and the QQCLS entity 660. Further, the QoS policy information may also be stored in the QDA entity 650 and the QQCLS entity 660 repository. When the QDA entity 650 and the QQCLS entity 660 receive a resource status update, the QDA entity 650 and the QQCLS entity 660 store the resource status update in the repository and send a notification to all functional elements that monitor the resource status update. The QDA entity 650 and the QQCLS entity 660 may transmit the resource state update notification to the quantum layer management function, the key management layer management function for failures, and a control layer management function for configuration, performance, security, and charging purpose, and may also transmit the resource state update notification to the QQPO entity 630 for multi-layer cross QoS management. The QDA entity 650 and the QQCLS entity 660 may use a second machine learning model to detect a network node in which QoS anomalies occur and a status of the node, and detect a network node in which security anomalies occur and a status of the node.

In step S624, the QDA entity 650 and the QQCLS entity 660 may transmit a resource status update to a QM/KM/CM entity 670 and the QQPO entity 630 in the QM entity. Here, the QM entity represents a QL management function of the QKDN manager, a KM entity represents a KML management function, and the CM entity represents a CL management function. The resource state update may indicate the QoS data collected in step S620.

In step S626, when the QM/KM/CM entity 670 receives the resource state update notification, the QM/KM/CM entity 670 performs fault, configuration, performance, security, and charging management of the provisioned resource. When re-provisioning is required, the QM/KM/CM entity 670 may request the QPP entity 640 to perform the failure, configuration, performance, security, and charging management of the provisioned resource.

The QM/KM/CM entity 670 may identify nodes requiring re-provisioning among the nodes in the QKDN using a third machine learning model. Specifically, the third machine learning model is trained to identify the nodes requiring the re-provisioning among the nodes in the QKDN from time-series training data including the provisioning status and the QoS data. The QM/KM/CM entity 670 may receive input time-series data including current the provisioning status and current the QoS data, and identify network nodes requiring the re-provisioning from the input time-series data. Thus, the QM/KM/CM entity 670 can accurately and efficiently identify the nodes requiring the re-provisioning from complex data.

In addition, the re-provisioning, suitability verification, and monitoring can be enforced autonomously without manual worker intervention according to a self-management policy.

In step S628, the QM/KM/CM entity 670 may request the QPP entity 640 to perform provisioning update (Prov Update Req) processes. When there is the network node requiring the re-provisioning, the QM/KM/CM entity 670 transmits a re-provisioning request to the QPP entity 640.

In step S630, when the QQPO entity 630 receives the resource status update notification, the QQPO entity 630 updates an available resource status and determines whether re-optimization is required according to the resource status update.

The QQPO entity 630 may identify the node requiring re-optimization among the nodes in the QKDN using a fourth machine learning model. Specifically, the fourth machine learning model is trained to identify a node requiring the re-optimization among the nodes in the QKDN from time-series training data including the provisioning status and the QoS data. The QQPO entity 630 may receive input time-series data including current the provisioning status and current the QoS data, and identify network nodes requiring the re-optimization from the input time-series data. Thus, the QQPO entity 630 can accurately and efficiently identify the nodes requiring the re-optimization from complex data.

In addition, the re-optimization, suitability verification and monitoring may be enforced autonomously without manual worker intervention according to the self-management policy.

In step S632, the QQPO entity 630 transmits a provisioning update (Prov Update Req) to the QPP entity 640 according to the re-optimization decision. When there is the network node requiring the re-optimization, the QQPO entity 630 transmits a re-optimization request to the QPP entity 640.

In step S634, when the QPP entity 640 receives a provisioning update request from the QM/KM/CM entity 670 or the QQPO entity 630, the QPP entity 640 may perform a re-provisioning operation on the provisioned resources.

In step S636, when the re-provisioning is completed, the QPP entity 640 creates a provisioning status (Prov Status) in the repositories of the QDA entity 650 and the QQCLS entity 660, and the QDA entity 650 and the QQCLS entity 660 may transmit notifications to the QM/KM/CM entity 670, the QQPO entity 630, and the QKDN QoS customer 610 for resource status update.

In step S638, the QDA entity 650 and the QQCLS entity 660 may transmit a notification of the resource status update to the QQPO entity 630. The QDA entity 650 and the QQCLS entity 660 may send the notification of the resource status update to the QM/KM/CM entity 670.

In step S640, the QQPO entity 630 transmits a provision status update to the QKDN QoS customer 610.

Figure 7:
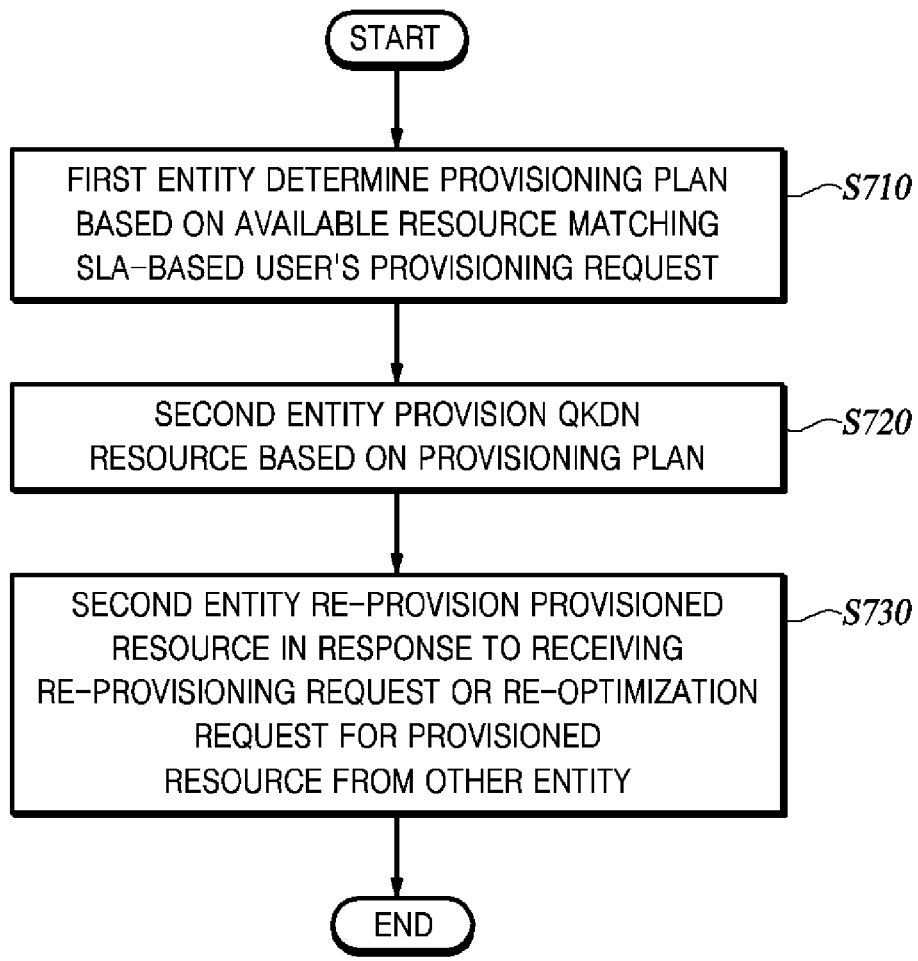
FIG. 7 is a flowchart of a QoS assurance method according to an embodiment of the present disclosure.

FIG. 7 is a flowchart of a QoS assurance method according to an embodiment of the present disclosure.

A QOS assurance device that performs the QoS assurance method includes a first entity, a second entity, third entities, and fourth entities, and may further include other entities. The first entity represents a QQPO entity, the second entity represents a QPP entity, the third entities represent a QDA entity and a QQCLS entity, and the fourth entities represent the QM/KM/CM entities. The first entity includes a first processor and a first memory configured to store first instructions executable by the first processor to cause the first entity to perform functions of the first entity. The second entity includes a second processor and a second memory configured to store second instructions executable by the second processor to cause the second entity to perform functions of the second entity. The third entities includes a third processor and a third memory configured to store third instructions executable by the third processor to cause the third entities to perform functions of the third entities. The fourth entities includes a fourth processor and a fourth memory configured to store fourth instructions executable by the fourth processor to cause the fourth entities to perform functions of the fourth entities.

Referring to FIG. 7, the first entity determines a provisioning plan for configuring resources corresponding to the SLA-based user's provisioning request (S710).

Specifically, the first entity receives the provisioning request, and determines a provisioning plan based on available resources that satisfy the QoS requirements according to the provisioning request among resources of the QKDN.

In this case, the first entity may acquire first output data including network coverage, capacity, and resource requirements according to the SLA from first input data including at least one of available resources in the QKDN, traffic estimates and topology of the quantum layer (QL) and the key management layer (KML), control and user data, and the entity information of the QKDN, and determine a provisioning plan based on the first output data. The first input data may be in the form of time series data. The first entity may use the first machine learning model to acquire the first output data from the first input data. The first machine learning model has been trained based on supervised learning algorithm.

The second entity provisions the QKDN resources based on the provisioning plan (S720).

Meanwhile, the third entities acquire second input data including the provisioning status and the QoS data for the provisioned resources. Here, the second input data may be in the form of time series data. The QoS data may include at least one of static the QoS data, dynamic QoS data, and performance data of a quantum layer (QL) and a key management layer (KML).

Thereafter, the third entities may detect anomalies in the QKDN from the second input data. Specifically, the third entities may use the second machine learning model to detect network nodes in which the QoS anomaly occurs and a status of the nodes and detect network nodes in which the security anomaly occurs and a status of the nodes. The third entities may request modification of the provisioning plan or re-provisioning. The second machine learning model has been trained based on supervised learning algorithm.

The second entity re-provisions the provisioned resources in response to receiving the re-provisioning request or the re-optimization request for the provisioned resources from other entities (S730).

Specifically, the first entity or the fourth entities may transmit the re-provisioning request or the re-optimization request to the second entity. Here, the fourth entities may identify the network node requiring the re-provisioning among the network nodes in the QKDN from the second input data using the third machine learning model. The first entity may update the available resources in response to receive a notification for status updates from the third entities, and determine re-optimization based on the update of the available resources. Otherwise, the first entity may identify the network node requiring the re-optimization among the network nodes in the QKDN from the second input using a fourth machine learning model. The third machine learning model and the fourth machine learning model has been trained based on supervised learning algorithm, respectively.

Figure 8:
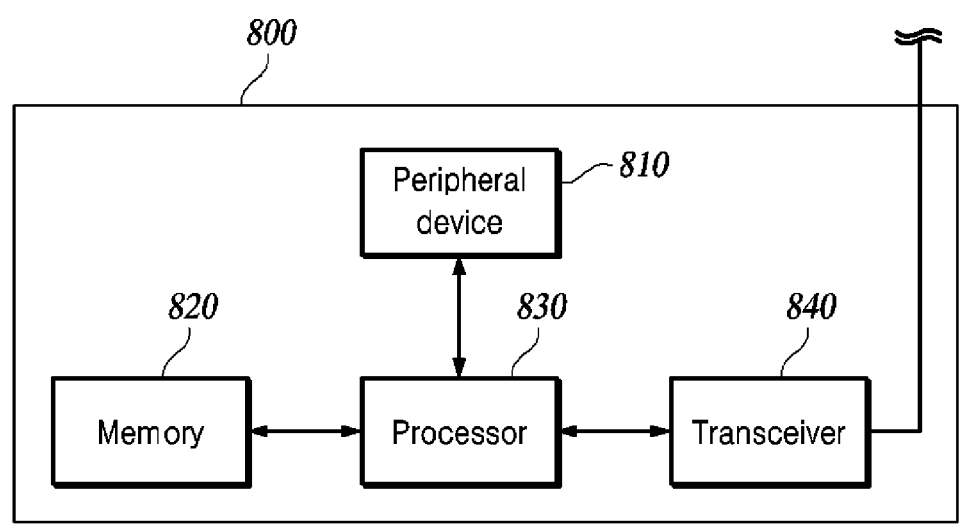
FIG. 8 is a diagram illustrating an example of a configuration of a QoS assurance device according to the present invention.

FIG. 8 is a diagram illustrating an example of a configuration of a QoS assurance device according to the present invention.

Referring to FIG. 8, the QOS assurance device may include a memory 820, a processor 830, a transceiver 840, and a peripheral device 501. Further, as an example, the QoS assurance device may further include other configurations, and is not limited to the above-described embodiment. In this case, as an example, the QoS assurance device may be a device for QoS assurance for QKDN. In this case, for example, the memory 820 may be a non-removable memory or a removable memory. For example, the peripheral device 810 may include a detector that detects a spatial image. Further, as an example, the peripheral device 501 may include a display, a GPS, or other peripheral devices, and is not limited to the above-described embodiment. Further, as an example, the above-described QoS assurance device may include a communication circuit like the transceiver 840, and may perform communication with an external QoS assurance device based on the communication circuit.

Further, as an example, the processor 830 may be at least one or more of a general-purpose processor, a digital signal processor (DSP), a DSP core, a controller, a microcontroller, application specific integrated circuits (ASICs), field programmable gate array (FPGA) circuits, any other type of integrated circuit (IC), and one or more microprocessors related to state machine. That is, the processor 830 may be a hardware/software configuration that performs a control role for controlling the above-described QoS assurance device. In this case, the processor 830 may execute computer-executable instructions stored in the memory 820 in order to perform various essential functions of the nodes. Further, the processor 830 may perform flattening of a spatial image. A PSNR for comparison between the spatial image and a 2D original image can be measured. Further, the processor may compare PSNR with a specific value. Further, the processor may perform flattening of the spatial image again when the PSNR is smaller than the specific value. The processor 830 may control at least one of signal coding, data processing, power control, input and output processing, and a communication operation. Further, the processor 830 may control a physical layer, a MAC layer, and an application layer. Further, as an example, the processor 830 may perform authentication and security procedures in an access layer and/or an application layer, and the present invention is not limited to the above-described embodiment.

Further, as an example, the processor 830 may communicate with other devices through the transceiver 840. For example, the transceiver 840 may transmit or receive a he PSNR value and an SSIM value calculated by the processor 830. Further, the transceiver 840 may transmit a 3D space image or a flattened space image stored in the memory 820 to the outside. Further, the processor 830 may perform control so that a node can communicate with other nodes via a network through execution of computer-executable instructions. That is, the communication performed in the present invention can be controlled. For example, transmission and reception of acquired sensor information and obstacle data may be controlled. For example, the transceiver 840 may transmit an RF signal through an antenna and may transmit a signal based on various communication networks. In addition, as an example, a MIMO technology, beamforming, or the like may be applied as an antenna technology, and the present disclosure is not limited to the above-described embodiment. Further, the signal transmitted or received through the transceiver 840 may be modulated or demodulated and controlled by the processor 830, and the present disclosure is not limited to the above-described embodiment.

According to an embodiment of the present disclosure, it is possible to autonomously manage a QoS life cycle in a QKDN.

According to an embodiment of the present disclosure, it is possible to efficiently manage a life cycle based on machine learning in the QKDN.

The effects of the present disclosure are not limited to the effects mentioned above, and other effects not mentioned will be clearly understood by those skilled in the art from the description.

At least some of the components described in the exemplary embodiments of the present disclosure may be implemented as hardware elements including at least one of a Digital Signal Processor (DSP), a processor, a controller, an Application-Specific IC (ASIC), a programmable logic devices (FPGA, etc.), other electronic components, or a combination thereof. Moreover, at least some of the functions or processes described in the exemplary embodiments may be implemented as software, and the software may be stored in a recording medium. At least some of the components, functions, and processes described in the exemplary embodiments of the present disclosure may be implemented as a combination of hardware and software.

The method according to the exemplary embodiments of the present disclosure may be written as a program that can be executed on a computer and may also be implemented as various recording media such as magnetic storage media, optical reading media, digital storage media, etc.

Various techniques described herein may be implemented in digital electronic circuitry, or in computer hardware, firmware, software, or combinations thereof. Implementations may be in the form of a computer program tangibly embodied in a computer program product, i.e., an information carrier, e.g., a machine-readable storage device (computer-readable medium) or a propagated signal, for processing by, or controlling, the operation of, a data processing device, e.g., a programmable processor, a computer, or a number of computers. A computer program, such as the above-mentioned computer program(s), may be written in any form of programming language, including compiled or interpreted languages and may be deployed in any form, including as a stand-alone program or as a module, component, subroutine, or other unit suitable for use in a computing environment. The computer program may be deployed to run on a single computer or multiple computers at one site or distributed across multiple sites and interconnected by a communications network.

In addition, components of the present disclosure may use an integrated circuit structure such as a memory, a processor, a logic circuit, a look-up table, and the like. These integrated circuit structures execute each of the functions described herein through the control of one or more microprocessors or other control devices. In addition, components of the present disclosure may be specifically implemented by a program or a portion of a code that includes one or more executable instructions for performing a specific logical function and is executed by one or more microprocessors or other control devices. In addition, components of the present disclosure may include or be implemented as a Central Processing Unit (CPU), a microprocessor, etc. that perform respective functions. In addition, components of the present disclosure may store instructions executed by one or more processors in one or more memories.

Processors suitable for processing computer programs include, by way of example, both general purpose and special purpose microprocessors, as well as one or more processors of any kind of digital computer. Generally, a processor will receive instructions and data from a read-only memory or a random access memory or both. The essential elements of a computer may include at least one processor that executes instructions and one or more memory devices that store instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include, by way of example, semiconductor memory devices, e.g., Magnetic Media such as hard disks, floppy disks, and magnetic tapes, Optical Media such as Compact Disk Read Only Memories (CD-ROMs) and Digital Video Disks (DVDs), Magneto-Optical Medial such as Floptical Disks, Rea Only Memories (ROMs), Random Access Memories (RAMs), flash memories, Erasable Programmable ROMs (EPROMs), Electrically Erasable Programmable ROMs (EEPROM), etc. The processor and the memory may be supplemented by, or incorporated in, special purpose logic circuitry.

The processor may execute an Operating System and software applications executed on the Operating System. Moreover, a processor device may access, store, manipulate, process, and generate data in response to software execution. For the sake of convenience, there is a case where a single processor device is used, but those skilled in the art will understand that the processor device can include multiple processing elements and/or multiple types of processing elements. For example, the processor device may include a plurality of processors or a single processor and a single controller. Other processing configurations, such as such as parallel processors, are also possible.

In addition, non-transitory computer-readable media may be any available media that can be accessed by a computer, and may include both computer storage media and transmission media.

This specification includes details of various specific implementations, but they should not be understood as limiting the scope of any invention or what is claimed, and should be understood as descriptions of features that may be unique to particular embodiments of a particular invention. In the context of individual embodiments, specific features described herein may also be implemented in combination with a single embodiment. On the contrary, various features described in the context of a single embodiment can also be implemented in multiple embodiments independently or in any appropriate sub-combination. Further, although the features may operate in a particular combination and may be initially described as so claimed, one or more features from the claimed combination may be in some cases excluded from the combination, and the claimed combination may be modified into a sub-combination or a variation of the sub-combination.

Likewise, although the operations are depicted in the drawings in a particular order, it should not be understood that such operations must be performed in that particular order or sequential order shown to achieve the desirable result or that all the depicted operations should be performed. In certain cases, multitasking and parallel processing may be advantageous. Moreover, the separation of various device components of the above-described embodiments should not be understood as requiring such separation in all embodiments, and it should be understood that the described program components and devices can generally be integrated together in a single software product or packaged into multiple software products.

The foregoing description is merely illustrative of the technical concept of the present embodiments. Various modifications and changes may be made by those of ordinary skill in the art without departing from the essential characteristics of each embodiment. Therefore, the present embodiments are not intended to limit but to describe the technical idea of the present embodiments. The scope of the technical concept of the embodiments is not limited by these embodiments. The scope of protection of the various embodiments should be construed by the following claims. All technical ideas that fall within the scope of equivalents thereof should be interpreted as being included in the scope of the present embodiments.

What is claimed is:

1. A device for a quantum key distribution network (QKDN), the device comprising:
a first entity comprising a first processor and a first memory configured to store first instructions executable by the first processor to cause the first entity to:
determine a provisioning plan based on available resources matching a service level agreement (SLA)-based user's provisioning request; and
a second entity comprising a first processor and a first memory configured to store first instructions executable by the first processor to cause the first entity to:
provision resources of the QKDN based on the provisioning plan; and
re-provision the provisioned resources in response to receiving a re-provisioning request or a re-optimization request for the provisioned resources from other entities,
wherein the first entity is configured to:
acquire first output data including network coverage, capacity, and resource requirements according to the SLA from first input data including at least one of available resources in the QKDN, traffic estimates, topology of a quantum layer (QL), a key management layer (KML), control, user data or entity information of the QKDN; and
determine the provisioning plan based on the first output data, and
wherein the available resources are elements constituting the QKDN, including at least one of a switch, a router, a quantum node capable of generating quantum cryptography keys, a key storage device for storing and managing keys, a transmission device for key transmission, and a control server or management server for controlling and managing the devices.

2. The device according to claim 1, further comprising:
third entities comprising a third processor and a third memory configured to store third instructions executable by the third processor to cause the third entity to:
acquire second input data including a provisioning status and quality of service (QOS) data for the provisioned resources; and
store the second input data.

3. The device according to claim 2, wherein the QoS data includes static the QoS data, dynamic QoS data, and performance data of a quantum layer (QL) and a key management layer (KML).

4. The device according to claim 2, wherein the third entities is configured to detect an anomaly in the QKDN from the second input data.

5. The device according to claim 2, further comprising:
fourth entities comprising a fourth processor and a fourth memory configured to store fourth instructions executable by the fourth processor to cause the fourth entity to:
identify a network node requiring re-provisioning among network nodes in the QKDN from the second input data using a machine learning model; and
transmit the re-provisioning request.

6. The device according to claim 2, wherein the first entity is configured to:
update the available resources in response to receive a notification for status updates from the third entities; and
determine re-optimization based on the update of the available resources.

7. The device according to claim 2, wherein the first entity is configured to:
identify a network node requiring re-optimization among network nodes in the QKDN from the second input data using a machine learning model; and
transmit the re-optimization request.

8. A computer-implemented method for a quantum key distribution network (QKDN), the method comprising:
determining, by a first entity, a provisioning plan based on available resources matching a service level agreement (SLA)-based user's provisioning request;
provisioning, by a second entity, resources of the QKDN based on the provisioning plan; and
re-provisioning, by the second entity, the provisioned resources in response to receiving a re-provisioning request or a re-optimization request for the provisioned resources from other entities,
wherein the first entity is configured to:
acquire first output data including network coverage, capacity, and resource requirements according to the SLA from first input data including at least one of available resources in the QKDN, traffic estimates, topology of a quantum layer (QL), a key management layer (KML), control, user data or entity information of the QKDN; and determine the provisioning plan based on the first output data, and wherein the available resources are elements constituting the QKDN, including at least one of a switch, a router, a quantum node capable of generating quantum cryptography keys, a key storage device for storing and managing keys, a transmission device for key transmission, and a control server or management server for controlling and managing the devices.

9. The method according to claim 8, further comprising:
acquiring, by third entities, second input data including a provisioning status and QoS data for the provisioned resources; and storing, by the third entities, the second input data.

10. The method according to claim 9, wherein the QoS data includes static the QoS data, dynamic QoS data, and performance data of a quantum layer (QL) and a key management layer (KML).

11. The method according to claim 9, wherein the third entities detect an anomaly in the QKDN based on the second input data.

12. The method according to claim 9, further comprising:
identifying, by fourth entities, a network node requiring re-provisioning among network nodes in the QKDN from the second input data using a machine learning model; and transmitting, by the fourth entities, the re-provisioning request.

13. The method according to claim 9, wherein the method comprises:
updating, by the first entity, the available resources in response to receive a notification for status updates from the third entities; and determining, by the first entity, re-optimization based on the update of the available resources.

14. The method according to claim 9, further comprising:
identifying, by the first entity, a network node requiring re-optimization among network nodes in the QKDN from the second input data using a machine learning model; and transmitting, by the first entity, the re-optimization request.

* * * * *